United States Patent [19]
Morse

[11] Patent Number: 5,561,786
[45] Date of Patent: Oct. 1, 1996

[54] COMPUTER METHOD AND SYSTEM FOR ALLOCATING AND FREEING MEMORY UTILIZING SEGMENTING AND FREE BLOCK LISTS

[75] Inventor: Peter L. Morse, Redmond, Wash.

[73] Assignee: Microsoft Corporation, Redmond, Wash.

[21] Appl. No.: 372,131

[22] Filed: Aug. 24, 1994

Related U.S. Application Data

[63] Continuation of Ser. No. 919,591, Jul. 24, 1992, abandoned.

[51] Int. Cl.⁶ .............................. G06F 15/40; G06F 9/44
[52] U.S. Cl. ............. 395/497.01; 395/600; 364/DIG. 1; 364/281.1; 364/280
[58] Field of Search ....................... 395/497.01, 497.02, 395/497.03, 497.04, 600, 700, 650

[56] References Cited

U.S. PATENT DOCUMENTS

| | | | |
|---|---|---|---|
| 4,775,932 | 10/1988 | Oxley | 364/200 |
| 4,907,151 | 3/1990 | Bartlett | 364/200 |
| 4,989,134 | 1/1991 | Shaw | 364/200 |
| 4,989,137 | 1/1991 | Oxley et al. | 395/425 |
| 5,218,698 | 6/1993 | Mandl | 395/650 |
| 5,321,834 | 6/1994 | Weiser et al. | 395/600 |

OTHER PUBLICATIONS

Brent, R. P., "Efficient Implementation of the First–Fit Strategy for Dynamic Storage Allocation," *ACM Transactions on Programming Languages and Systems*, vol. 11, No. 3, Jul. 1989, pp. 388–403.

E. T. Boyle et al., "Space Reclamation in Virtual Storage Systems," *IBM Technical Disclosure Bulletin*, vol. 18, 1976, pp. 2582–2583.

"General–Purpose Memory Allocation Interface," *IBM Technical Disclosure Bulletin*, vol. 30, No. 12, 1988, p. 280.

"Linked List Search Table Array For Free Storage Blocks," *IBM Technical Disclosure Bulletin*, vol. 33, No. 8, 1991, pp. 474–479.

S. L. Goncharsky et al., "Use Of Binary Tree For Storage Allocation," *IBM Technical Disclosure Bulletin*, vol. 24, No. 6, 1981, pp. 2710–2712.

H. M. Deitel, *Operating Systems*, 2d ed., Addison Wesley, 1990, pp. 187–191, 197–203.

Stuart E. Madnick and John J. Donovan, *Operating Systems*, McGraw–Hill Book Co., 1974, pp. 114–121.

George E. Luger and William A. Stubblefield, *Artificial Intelligence*, The Benjamin/Cummings Publishing Co., 1989, pp. 94–96, 427, 428.

Harold Lorin and H. M. Deitel, *Operating Systems*, 2d ed., Addison Wesley, 1981, pp. 286–289.

*Primary Examiner*—Kevin A. Kriess
*Attorney, Agent, or Firm*—Seed and Berry LLP

[57] ABSTRACT

A method and system for allocating and freeing memory is provided. A requesting program running on a computer system allocates a logically contiguous block of memory (a "heap") for the temporary storage of data structures. A Heap Manager, provided by the present invention, manages the heap in response to requests from the requesting program. The Heap Manager logically divides the heap into segments and maintains a free list for each segment. The free list is a list of the free blocks contained in a segment. The heap has an associated free block array and an associated size tree. The free block array contains entries, each entry pointing to a free list. Each leaf node of the size tree corresponds to entries in the free block array. A value contained in each leaf node indicates the size of the largest free block in the segments corresponding to the entries. The Heap Manager selects a free block for allocation to the requesting program by searching to size tree and the free block array and selecting segment that contains a free block that will satisfy the request, and then searching the free list corresponding to the selected segment to locate the smallest free block that satisfies the request.

28 Claims, 10 Drawing Sheets

COMPUTER METHOD AND SYSTEM FOR ALLOCATING AND FREEING MEMORY UTILIZING SEGMENTING AND FREE BLOCK LISTS

CROSS-REFERENCE TO RELATED APPLICATION

This application is a continuation of U.S. patent application Ser. No. 07/919,591, filed Jul. 24, 1992 now abandoned.

TECHNICAL FIELD

This invention relates generally to a computer method and system for memory management, and, more particularly, to a method and system for allocating, freeing, and compacting memory that uses a heap structure.

BACKGROUND OF THE INVENTION

A computer system may manage computer memory dynamically. Dynamic memory management refers to the process by which blocks of memory are allocated temporarily for a specific purpose and then deallocated or freed when no longer needed for that purpose. Free blocks are available for reallocation for another purpose. The process that dynamically manages memory is referred to as the memory manager. The memory that the memory manager manages is referred to as a "heap." A heap is a portion of memory reserved for a program to use for the temporary storage of data structures whose existence or size cannot be determined until the program is running. The program can request a block of free memory having a certain size, use it, and later request that the block be freed. The memory manager allocates differently sized blocks of memory from the heap according to the needs of the requesting program.

When a program needs a block of memory, the program sends a request to the memory manager. The memory manager allocates a block of memory from the heap to satisfy the request and then sends a handle or pointer to the block of memory back to the requesting program. The requesting program can then access the block of memory through the handle or pointer. When the requesting program is finished using the block of memory, the program notifies the memory manager that the block is no longer needed. The memory manager then frees the block of memory to make the block available for allocation. When the memory manager cannot allocate a block of memory to a requesting program (because the heap does not contain a large enough block), the memory manager usually compacts the heap to consolidate all of the free blocks.

SUMMARY OF THE INVENTION

It is an object of the present invention to provide an improved memory management process for a computer memory.

It is another object of the present invention to provide an improved method of allocating a block of memory to a requesting program.

It is another object of the present invention to provide an improved method of freeing a block of memory when the memory is no longer needed by a requesting program.

It is yet another object of the present invention to provide an improved method of compacting memory.

These and other objects, which will become apparent as the invention is more fully described below, are obtained by an improved method and system for dynamic memory management. In a preferred embodiment, a requesting program running on a computer system allocates a contiguous block of memory (a "heap") for the temporary storage of data structures. A Heap Manager, provided by the present invention, manages the heap in response to instructions from the requesting program. The Heap Manager divides the heap into $2^n$ segments having uniform size. The Heap Manager allocates blocks of memory to the requesting program. When the requesting program is finished using a block of memory, the Heap Manager frees the block of memory so that the block of memory can be allocated.

In a preferred embodiment, the Heap Manager maintains a free list for each segment, which is a linked list of the free blocks beginning in that segment. Each free list is accessible through a maximum free block array and a size tree. The maximum free block array has a plurality of entries; each entry corresponds to a segment and points to the beginning of the free list for the segment. The size tree is a complete binary tree, arranged in such a way that the value of each node is equal to the largest value of its child nodes. Each leaf node of the size tree corresponds to two entries in the maximum free block array. The value contained in each leaf node indicates the size of the largest free block in the segments corresponding to two entries in the free block array.

The Heap Manager allocates a block of memory to a requesting program by selecting a free block of memory of a requested size from the heap. The Heap Manager selects the free block by searching the size tree and free block array and selecting a segment that contains a free block that will satisfy the request, and then searching the free list corresponding to the selected segment to locate the smallest free block that satisfies the request. The Heap Manager frees a block of memory at the request of a requesting program and consolidates the freed block with any free blocks that may be located immediately above or below the freed block.

When the Heap Manager cannot satisfy an allocation request, the Heap Manager makes an out of memory call, which gives the requesting program the option of compacting the heap, or allocating the heap to a larger or smaller size. The Heap Manager compacts the heap by moving the allocated blocks to higher addresses in the heap, thereby consolidating the free blocks at the lower addresses. The Heap Manager optionally maintains handles to the allocated blocks to keep track of where they are moved. When the requesting program provides a call back routine, the Heap Manager invokes the call back return to notify the requesting program when an allocated block is going to be moved so that the requesting program can update any pointers it has to the allocated block.

DETAILED DESCRIPTION OF THE INVENTION

Figure 1:
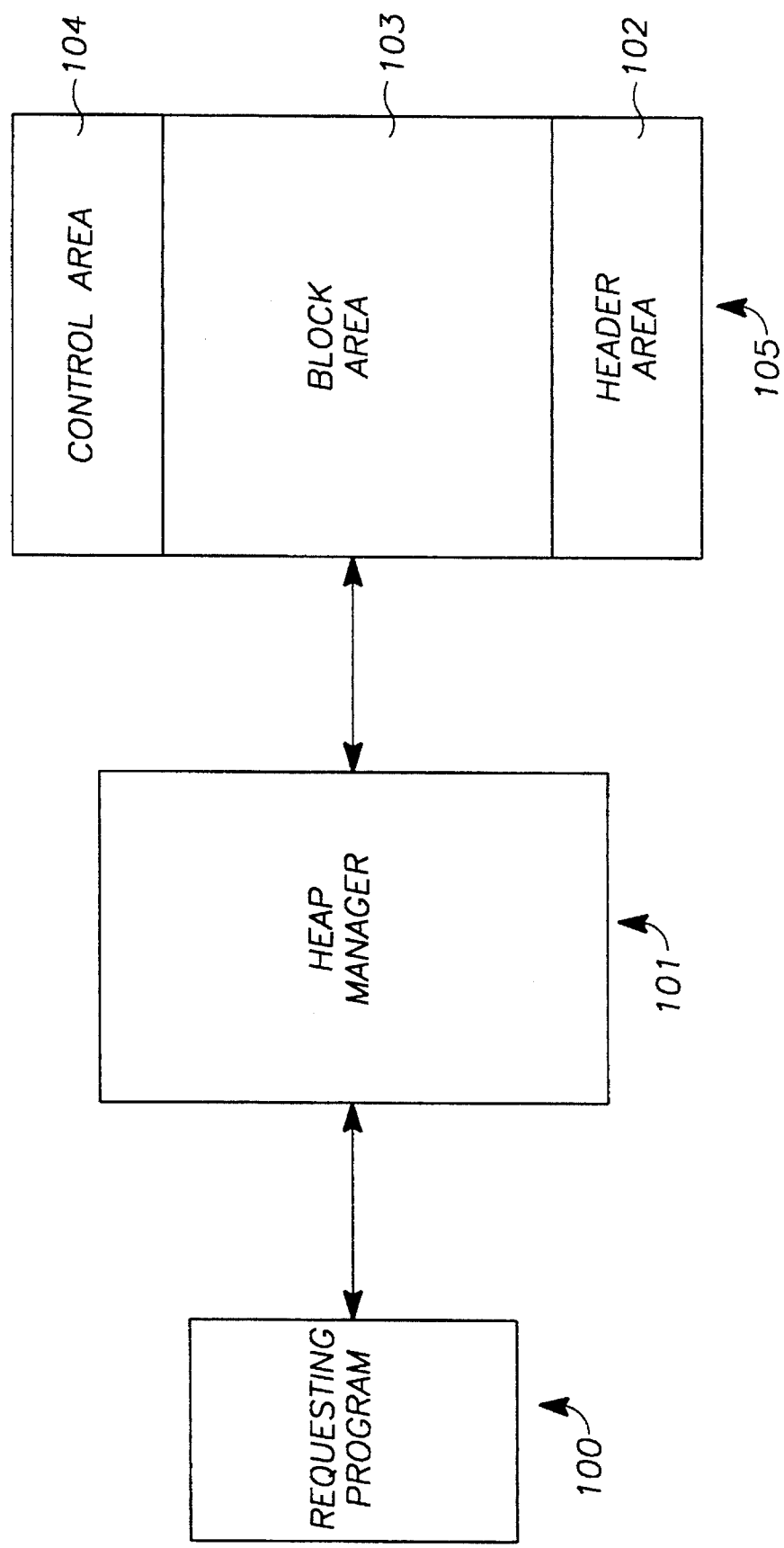
FIG. 1 is a schematic diagram showing the relationship between a requesting program, the Heap Manager, and the heap.

The present invention provides a method and system for dynamic memory management of a heap. A heap is a logically contiguous area of memory used by a requesting program for the temporary storage of data structures. A program called the Heap Manager responds to service requests made by a requesting program running on a computer system. The service requests include allocating, freeing, and compacting memory space within the heap. FIG. 1 is a schematic diagram showing the relationship between the requesting program 100, the Heap Manager 101, and the heap 105.

In a preferred embodiment, a memory manager maintains various data structures within the heap. Referring to FIG. 1, in a preferred embodiment of the present invention, a heap 105 is divided into three major areas: header area 102 which holds control information; block area 103 which contains blocks of memory that are allocated and freed upon request; and control area 104 which contains control information. Header area 102 is physically located below block area 103, which is physically located below control area 104. When referring to locations within the heap, "below" means at a lower memory address, while "above" means at a higher memory address. Alternatively, header area 102 and control area 104 are not physically located next to block area 103.

Header area 102 contains control information, such as the size of the heap and pointers to structures in control area 104 and to specific blocks within block area 103. Block area 103 is divided into segments. A segment is a logically contiguous area of memory used by the Heap Manager in maintaining lists of free blocks. The division of block area 103 into segments is described in more detail below. Block area 103 is also divided into blocks. A block is a logically contiguous area of memory which is allocated and freed by the Heap Manager at the request of a requesting program.

Each block in block area 103 begins with a size field which indicates the size of the block. Block sizes are preferably even numbers because the low-order bit of the size field is used to indicate whether the block is free. A free block has the low-order bit of the size field set while an allocated block has this bit clear. All free blocks within a segment are linked together to form a free list for that segment. Each free block contains a pointer, preferably located after the size field, to the next smaller free block that starts in the same segment. Thus, each segment has a corresponding free list which is a linked list (according to size) of free blocks in that segment. The last field of each block is used as a free hint field. The free hint field is set to a unique signature value if the block is free. The free hint field is used when freeing a block to aid in determining whether the freed block is adjacent to a free block. If so, the freed block is combined with the adjacent free block to form one free block.

Control area 104 comprises a maximum free block array and a size tree. The maximum free block array is a list that contains one entry for each segment. Each entry in the maximum free block array points to the beginning of the free list for the segment that corresponds to the entry. As described above, the free list for each segment is a linked list of free blocks in the segment according to size, such that the largest free block in the segment is the beginning of the free list.

The size tree is a data structure that comprises nodes that are linked together in a hierarchical fashion. The nodes contain values representing the size of the largest free block in each subtree. The topmost node is called the root node. The root node has two child nodes and the root node is the parent node to its child nodes. Each child node in the size tree has two child nodes of its own. Every node in the size tree has exactly one parent node, except for the root node, which has none. A node that has no child nodes is called a leaf node. The size tree is a complete binary tree with the property that the value contained in any node is equal to the larger of the values contained in either of its child nodes. The size tree is preferably organized so that each child node is positioned at locations 2N and 2N+1 for a parent node N. The size tree organizes the segments based on the size of the largest free block in each segment. The size tree contains N−1 nodes where N is equal to the number of segments in the block area. Each node of the size tree contains the size of the largest free block available in its subtree, so that the root node contains the size of the largest free block in the heap. Each leaf node of the size tree corresponds to two entries in the maximum free block array such that the leaf node contains the size of the largest free block pointed to by the corresponding entries in the maximum free block array.

The block area is divided into $2^n$ segments to correspond with the size tree being a complete binary tree. In a preferred embodiment, during heap initialization the Heap Manager determines the number of segments by dividing the size of block area 103 by a minimum segment size and then rounding the result to the next lower power of two. The minimum segment size (as specified by the requesting program) is an arbitrary value, commonly 1000–2000 bytes, based on the needs of the requesting program. The final segment size is determined by dividing the size of block area 103 by the number of segments.

Figures 2A, 2B:
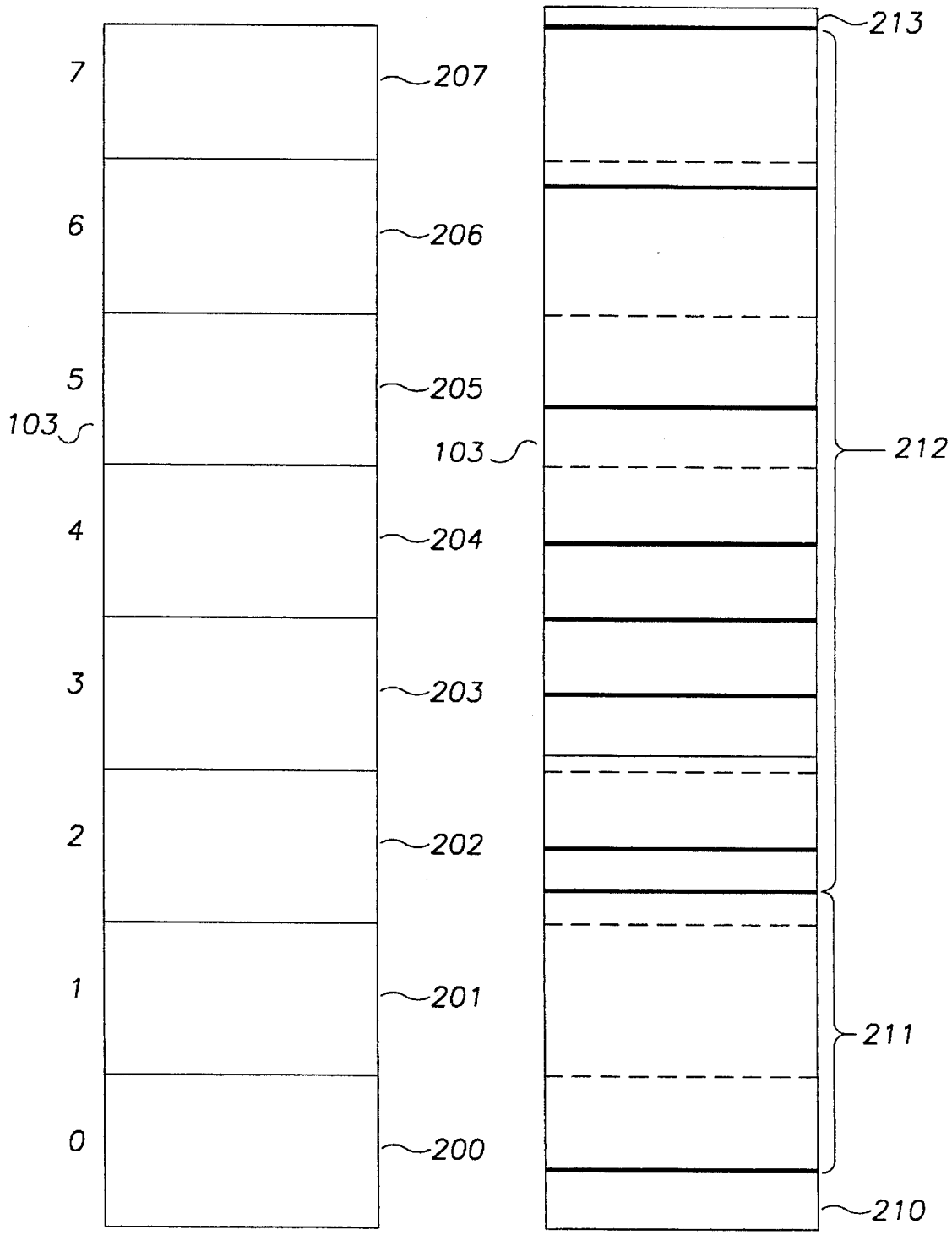
FIG. 2A is a sample segment layout of the block area referred to in FIG. 1.
FIG. 2B is a sample block layout of the block area referred to in FIG. 2A.

For example, if block area 103 contains 900 bytes and the minimum segment size is 100 bytes, then the Heap Manager determines the final segment size as follows. First, the Heap Manager divides the size of block area 103 by the minimum segment size, which results in 9 (900/100). Second, the Heap Manager rounds the result to the next lower power of two to determine the number of segments. Nine rounded down to the next lower power of two results in 8 segments. Last, the Heap Manager divides the size of block area 103 (900) by the number of segments (8) to determine the final segment size, which is 113 bytes (900/8). The last segment is only 109 bytes because the number of segments in this example does not divide evenly into the size of the block area. FIG. 2A is a sample segment layout of block area 103 having 8 segments 200–207.

FIG. 2B is a sample block layout of block area 103, where the segment boundaries are shown with dashed lines and the block boundaries are shown with solid lines. Block area 103 comprises handle block 210, master block 211, data blocks 212 and end block 213. A requesting program accesses a data block using a block identifier, which may be a handle or a pointer. A handle is an identifier of an allocated block of memory and can be thought of as a pointer to a pointer. When a requesting program requests a block of memory, the Heap Manager allocates a block of memory and returns to the requesting program a block identifier for the allocated block. Whenever the program requests a management service (e.g., freeing a block), the program identifies the block using the block identifier. Handle block 210 is preferably located below data blocks 212 so that handle block 210 will not be moved during heap compaction as discussed below.

Master block 211 is preferably located between handle block 210 and data blocks 212. Master block 212 contains available memory space that can be transferred to the top of handle block 210 or to the bottom of data blocks 212. When the heap is initialized, the master block contains all available free space. The Heap Manager allocates a data block to a requesting program by transferring free space from the top of master block in the form of a data block. Because it can be used to provide additional space for blocks above and below it, the master block may not always contain extra space. Data blocks 212 are those blocks that are either allocated to a requesting program or free and available for allocation. The allocation and freeing of blocks is described below and illustrated in FIGS. 4 and 5, respectively. End block 213 contains free space to be used during a heap shake, which is described in more detail below under the heading "Debugging." Master block 211 and end block 213 are marked as allocated blocks so that they will not be allocated to a requesting program. End block 213 is also used during freeing a data block.

Figure 3:
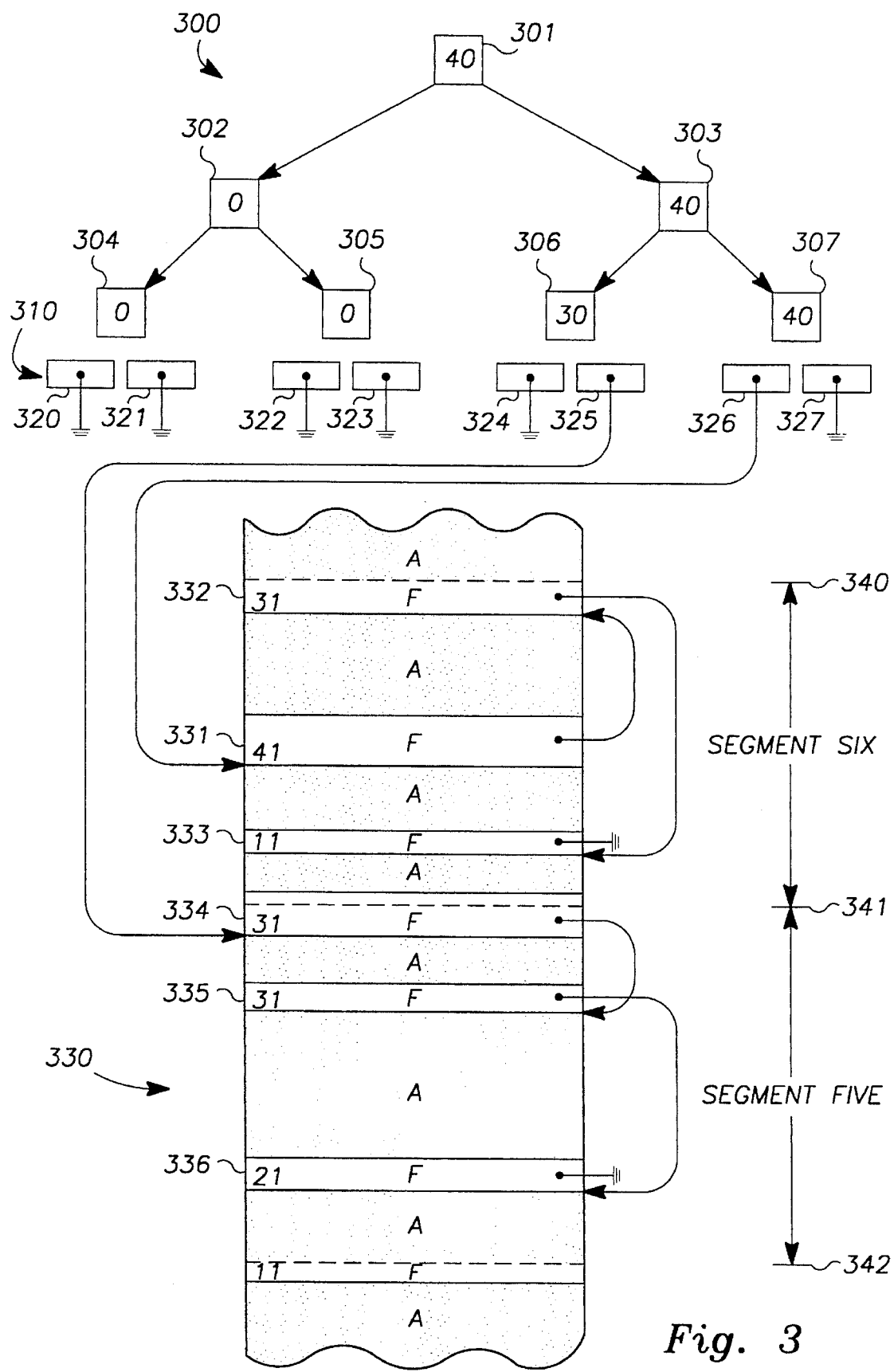
FIG. 3 is a schematic diagram showing the relationship between the control area and a portion of the block area.

FIG. 3 is a schematic diagram showing the relationship between the control area and a portion of the block area. In this example, the block area has been divided into eight segments (segment boundaries 340–342 are shown with dashed lines). The control area contains a size tree 300 and a maximum free block array 310. Entries 320–327 in the maximum free block array correspond to segments 0–7 in the block area, respectively. Only data blocks in segments 5 and 6 are shown in FIG. 3. Entry 326 in the maximum free block array 320 points to the beginning of the free list for segment 6. Block 331 is the beginning of that free list. Block 331 in turn contains a pointer to the next smaller free block 332, and block 332 contains a pointer to the next smaller free block 333. Note that the free block 334 is not included in the free list for segment 6, even though free block 334 extends across segment boundary 341. Entry 325 in the maximum free block array 310 contains a pointer to free block 334, the beginning of the free list for segment 5. The free list for segment 5 contains blocks 334–336.

The example used in FIG. 3 shows entries 320–324, and 327 of the maximum free block array 310 (corresponding to segments 0–4 and segment 7, respectively) containing null pointers. A null pointer indicates that no free blocks are available in the corresponding segment. Leaf nodes 304, 305 (corresponding to entries 320–323, which in turn correspond to segments 0–3) each contain a 0 value to reflect the size of the largest free block in segments 0 through 3. Leaf node 306 contains 30, which is the size of the largest free block in segments 4 and 5. Leaf node 307 contains 40, which is the size of the largest free block in segments 6 and 7. Because each node of the size tree contains the size of the largest free block available in its subtree, node 302 contains 0 and node 303 contains 40. The root node 301 contains 40, which is the size of the largest free block in the heap.

In an alternate embodiment, the size tree for the above example would consist only of nodes 303, 306, and 307. Node 303 would be the root node. The Heap Manager maintains a pointer in header area 102 of FIG. 1 to the root node of the size tree. Segments 0–3 would not be represented in the size tree because they do not contain any free blocks. This embodiment of the size tree would reduce the amount of searching that needs to be done to find a free block of a particular size. If a block becomes free in segments 0, 1, 2, or 3, then the size tree 300 would grow to include nodes 301, 302, 304, and 305 and the pointer to the root node would be adjusted accordingly.

The Heap Manager described herein supports both handle and pointer references to data blocks. During compaction, the Heap Manager will perform an optional call back to the requesting program indicating that the Heap Manager is moving a block to a new location. The requesting program can then update any pointers it may be using to reflect the new location of the block. During allocation, if no handles are available in the handle block, the Heap Manager takes space from the bottom of the master block to enlarge the handle block. If the master block is too small, the Heap Manager compacts the heap and retries the request. Alternatively, the Heap Manager calls a routine supplied by the requesting program. This routine is described below under the heading "Compacting the Heap."

Allocating a Data Block.

Figure 4:
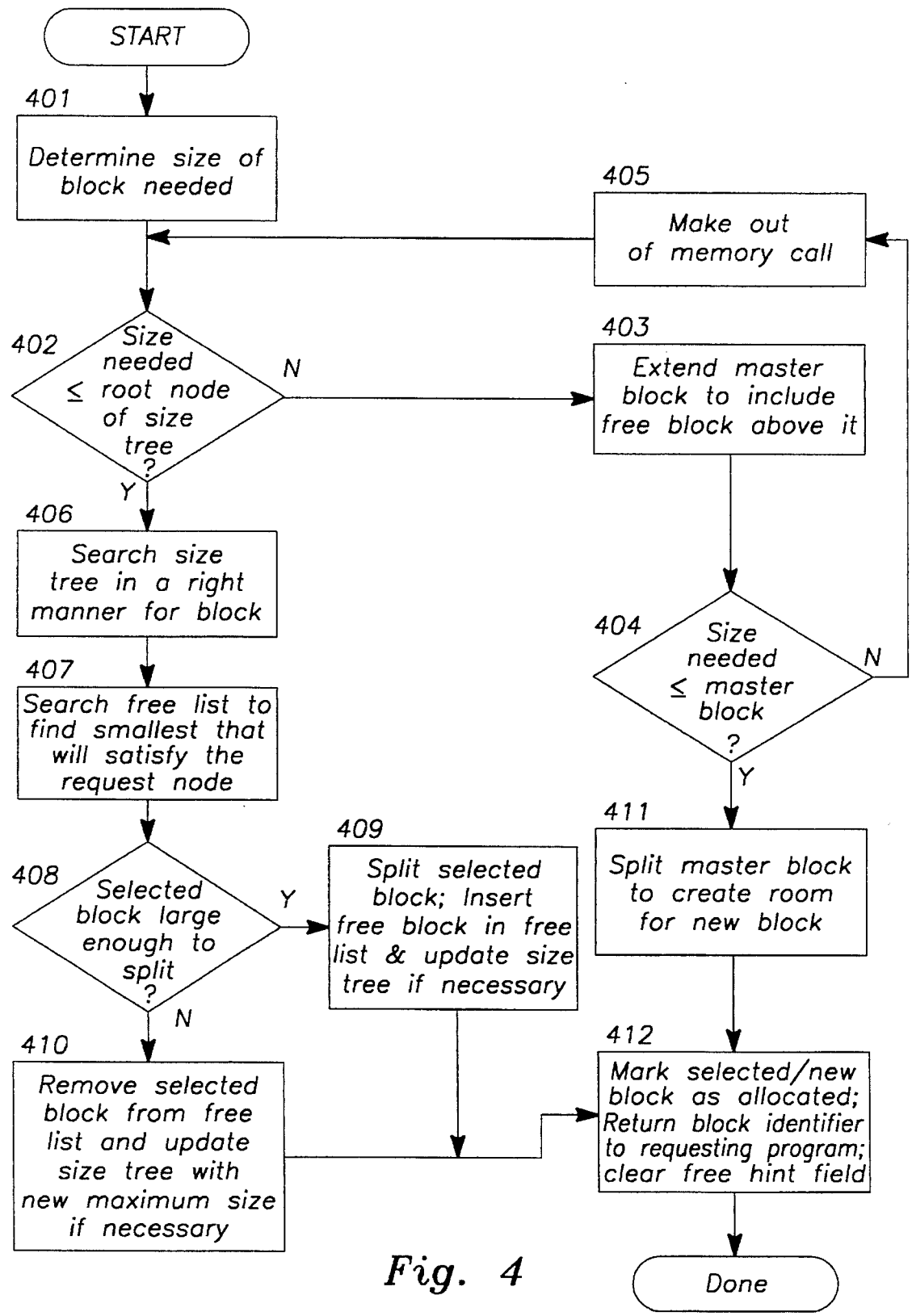
FIG. 4 is a detailed flow diagram of a method used by the present invention to allocate a data block to a requesting program.

FIG. 4 is a flow diagram of a preferred embodiment of the present invention. The flow diagram outlines a method used by the Heap Manager to allocate a data block to a requesting program. An allocation request for a data block having a requested size is passed to the Heap Manger. The process begins in step 401 where the Heap Manager determines the size of the block needed. The Heap Manager must add the size of the size field and any other administrative fields used internally by the Heap Manager to the size requested by the requesting program. In step 402, the Heap Manager determines if the request can be satisfied by comparing the size of the block needed with the value contained in the root node of the size tree (which is the size of the largest free block). The Heap Manager maintains a pointer to the root node of the size tree in header area 102 of FIG. 1. If the size of the block needed is less than or equal to the value contained in the root node of the size tree, then a data block is currently available to satisfy the data block request.

The process continues to step 406 where the Heap Manager searches the size tree in a right-hand manner for a block large enough to satisfy the request. The tree is searched in a right manner to ensure that free blocks at higher addresses will be allocated before free blocks at lower addresses. For example, if both child nodes contain values that are large enough to satisfy the request, the right child node is selected over the left child node. In the same way, if both entries in the maximum free block array point to free lists that contain a block large enough to satisfy the request, the right entry is selected over the left entry.

Once the Heap Manager selects an entry in the maximum free block array, the process continues to step 407 where the Heap Manager searches the free list pointed to by the selected entry to find and select the smallest available free block which will satisfy the request. After such a free block has been selected, in step 408 the Heap Manager determines whether the selected free block is large enough to partition into two blocks and still satisfy the request. A free block is large enough to partition into two blocks if one block is large enough to satisfy the request and the other block is large enough to store the necessary pointer information and block size. If so, the process continues to step 409 where the block is partitioned into two blocks—one for allocation to the requesting program and one to remain in the free list. The remaining portion of the free block is inserted into the free list at the appropriate location and, if necessary, the size tree and maximum free block array are updated with the new (smaller) maximum size.

If the selected free block is not large enough to partition into two data blocks and still satisfy the request, in step 410 the Heap Manager removes the selected free block from the free list and, if necessary, the size tree and maximum free block array are updated. The process ends with step 412 where the Heap Manager marks the selected free block as allocated by clearing the free hint field and the low-order bit of the size field. The Heap Manager returns to the requesting program a block identifier that is a handle or pointer reference to the address of the selected free block. The block identifier references a memory location immediately above the size field.

Referring to step 402, if the size of the data block needed is larger than the value contained in the root node of the size tree, then a free block is not available in the block area to satisfy the request. The Heap Manager attempts to satisfy the requesting program by taking space from the master block if space is available. The size of the master block is stored in the size field of the master block and the pointer to the master block is stored in the header area. Before taking space from the master block, in step 403 the Heap Manager tries to extend the master block by consolidating it with a free block that might be located immediately above the master block. Then, in step 404, the Heap Manager determines if the data block request can be accommodated by the master block. This determination is made by comparing the size of the data block needed with the size of the master block. If the master block is not large enough to satisfy the request, the Heap Manager makes an out of memory call in block 405 and the returns to block 402 to retry.

Alternatively, the Heap Manager calls a routine supplied by the requesting program. This routine is described below under the heading "Compacting the Heap." After compaction, the process loops back to step 402 where the Heap Manager determines if there is enough memory to satisfy the request. If, after compaction or expansion of the heap, there is not enough memory to satisfy the request, the Heap Manager notifies the requesting program that the request cannot be satisfied.

If, in step 404, the master block is large enough to satisfy the request, the process skips to step 411 where the Heap Manager transfers the requested amount of space from the master block to create a new data block. After the data block is created from space transferred from the master block, the process ends with step 412 where the Heap Manager marks the newly created data block as allocated by clearing the low-order bit of the size field. The Heap Manager returns to the requesting program a block identifier for the newly created block. The block identifier refers to the memory immediately above the size field of the block.

Freeing a Data Block.

Figure 5A:
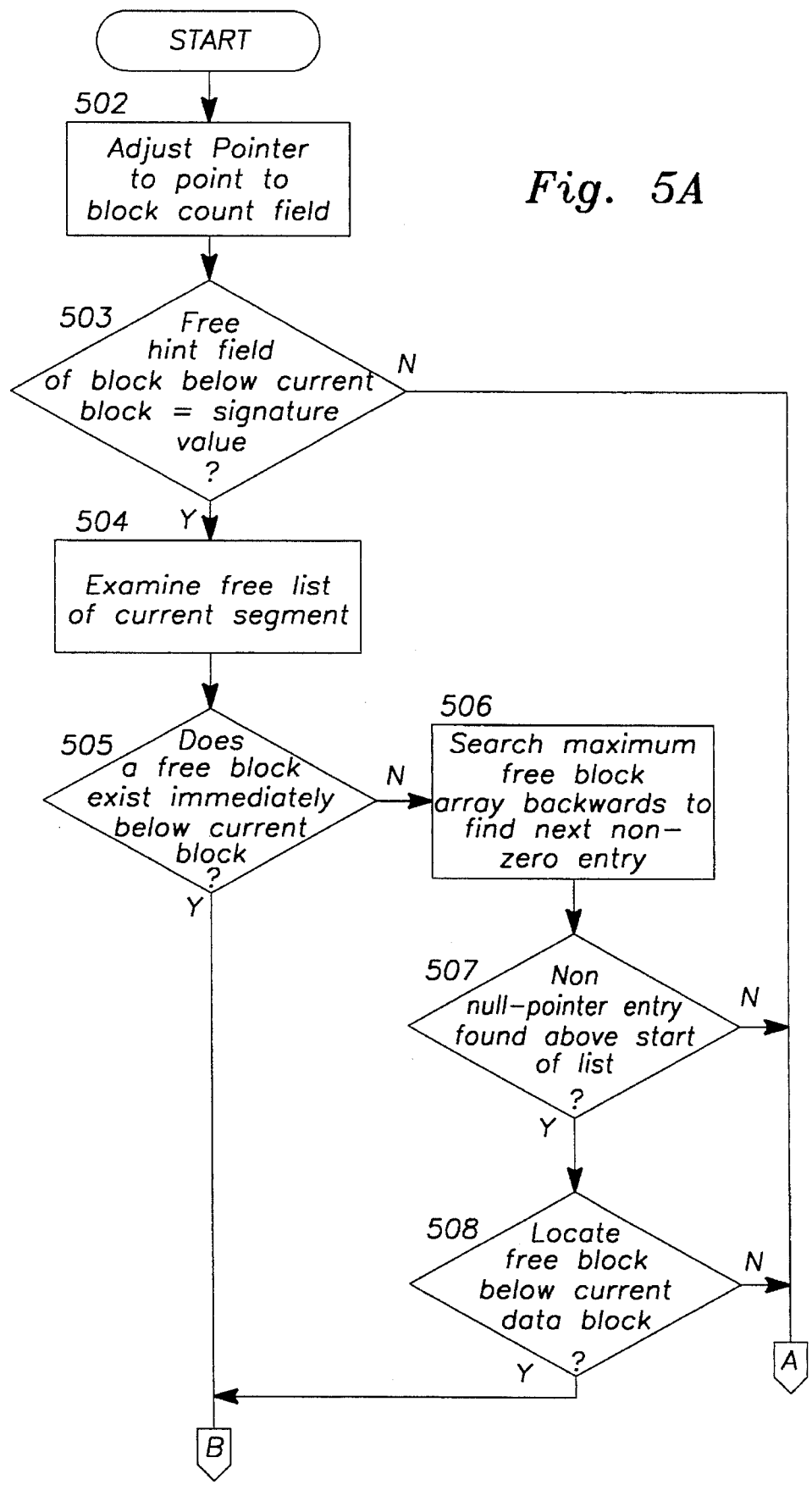
FIGS. 5A–B are detailed flow diagrams of a method used by the present invention to free a data block at the request of a requesting program.
Figure 5B:
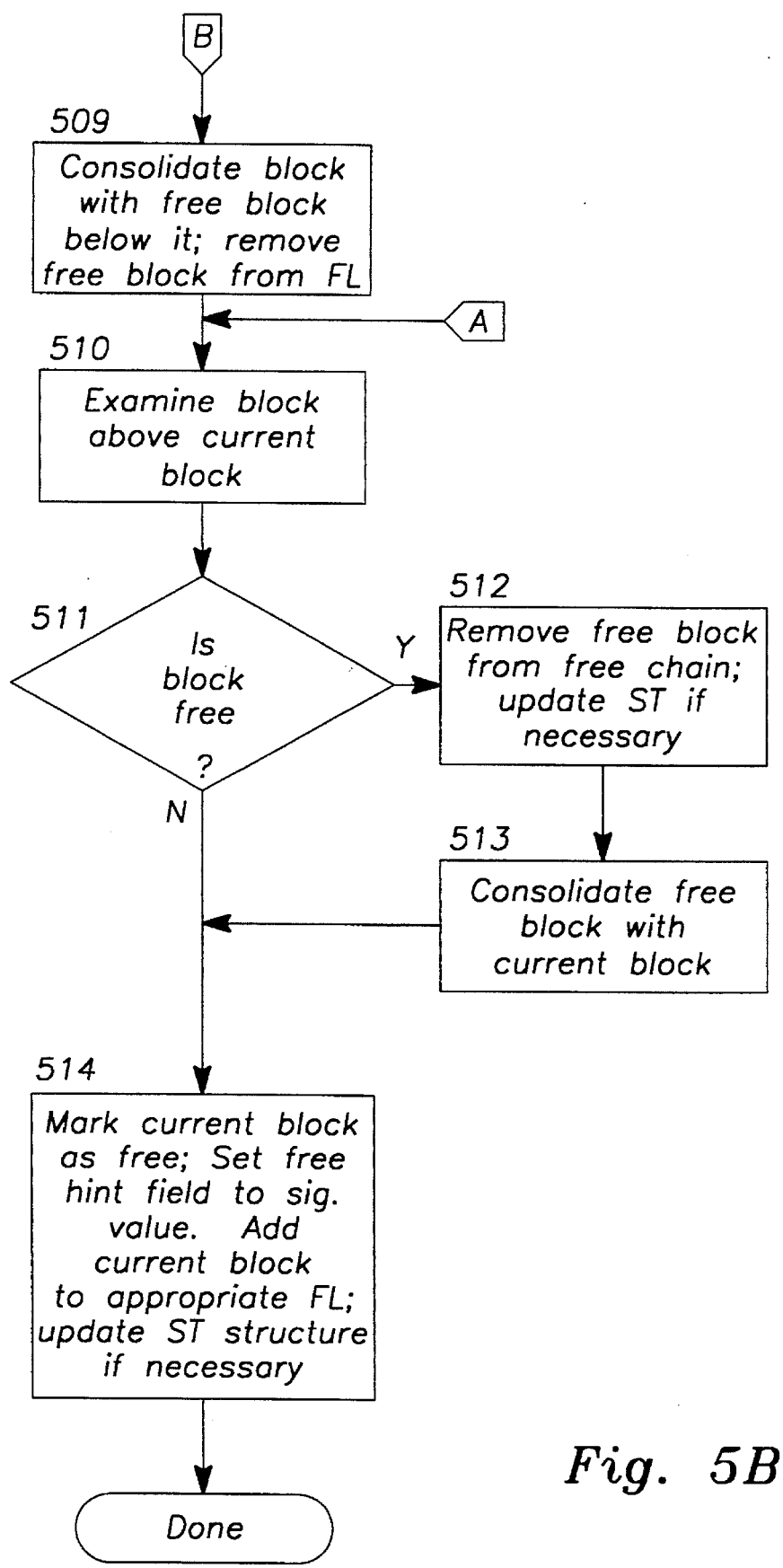

FIGS. 5A–B illustrate a flow diagram of a preferred embodiment of the present invention. The flow diagram outlines a method used by the Heap Manager to deallocate or free a data block. When a data block is freed, it is combined with any free blocks that are located immediately above or below it in the heap. A requesting program passes the block identifier of the data block that is to be freed (the current block) to the Heap Manager.

The process begins in step 502, where the Heap Manager sets a pointer to point to the beginning of the current block by adjusting the block identifier provided by the requesting program. The size field contains the size of the block, and is located at the beginning of the block. The process continues on to step 503 where the Heap Manager checks the free hint field of the block immediately below the current block. The free hint field is the last field in each data block. The free hint field allows the Heap Manager to quickly check to see whether a block might be free.

If the free hint field of the block immediately below the current block contains a signature value, the block might be free. When the free hint field does not contain a signature value, then the block is allocated. If the free hint field indicates the block is allocated, the process skips to block 510 in FIG. 5B. If the free hint field indicates the block might be free, the Heap Manager must do further checking to determine whether the block is free. The free hint field does not guarantee the block is free; data contained in an allocated block might look like the signature value used by the Heap Manager.

When the free hint field of the block immediately below the current block (the lower block) indicates the block might be free, the Heap Manager must check the low-order bit of the size field in the lower block. To find the starting location of the lower block, the Heap Manager searches the free list for the segment that contains the current block (the current segment) to try to find the lower block. As the Heap Manager traverses the free list, it checks the address of each block in the free list until it finds an address below the address of the current block. By adding the size of the found block to the address of the block, the Heap Manager can determine if the block is immediately below the current block.

If the lower block is not in the free list for the current segment, the Heap Manager must search the segments below the current segment. The Heap Manager searches the entries of the maximum free block array corresponding to segments below the current segment until a non-null pointer entry is found. Once a non-null pointer entry is found, the Heap Manager searches the free list pointed to by the entry to determine if the free list contains a free block that is just before the current block.

In steps 504–505, the Heap Manager examines the free list for the segment that contains the current block (the current segment) to determine whether a free data block exists immediately below the current block. If a free block is not found in the free list for the current segment, the process continues on to step 506, else the process skips to step 509 in FIG. 5B. In steps 506–507, the Heap Manager searches the maximum free block array backwards, starting below the entry corresponding to the current segment entry, to find the next non-null pointer entry. If no such entry is found, the process skips to step 510 in FIG. 5B.

If a non-null pointer entry is found, the process continues on to step 508 where the Heap Manager examines the free list pointed to by the non-null pointer entry in the maximum free block array to determine if a free block exists immediately below the current block. If no such free block is found, the process skips to step 510 in FIG. 5B. If such a free block is found, the process continues on to step 509 in FIG. 5B.

Referring to FIG. 5B, in step 509, the Heap Manager consolidates the current free block with the free block immediately below it and removes the lower free block from the free list for the lower block.

Next, in steps 510–511, the Heap Manager examines the data block above the current block (the upper block) to determine if that block is free. Because the size of the current block is stored in the size field, the Heap Manager determines the address of the block immediately above the current block by adding the size of the current block to the address of the current block. Once the address is known, the Heap Manager can also determine which segment contains the upper block. The low-order bit of the size field is set if the block is free, and clear if the block is allocated. If the upper block is free, the process continues on to step 512 where the Heap Manager removes the upper block from its free list and then updates the size tree, if necessary.

When the current block is located at the top of the block area, the end block is immediately above the current block. Because the end block is marked as allocated, the Heap Manager does not combine the current block with the end block. The end block guarantees that a valid block will always exist above a block being freed.

In step 513, the Heap Manager consolidates the upper block with the current block. If the upper block is not free, the process skips to step 514. In step 514, the Heap Manager marks the current block as free by setting the low-order bit of the size field to 1 and by writing a signature value to the free hint field. The Heap Manager then adds the current block to the free list for the current segment, and, if necessary, updates the size tree and the maximum free block array.

Compacting the Heap.

When the Heap Manager cannot locate a free data block in the heap large enough to satisfy an allocation request from a requesting program, the Heap Manager compacts the heap and retries the request. Alternatively, the Heap Manager calls a routine supplied by the requesting program. The routine may do whatever actions are appropriate including making other service requests to the Heap Manager to free memory. Normally, the routine supplied by the requesting program will either return with no action (which will cause the allocation request to return with a null value) or it will execute some combination of service requests to free data blocks or request the Heap Manager to compact the heap. During compaction, the Heap Manager, for each data block to be moved, calls a routine, if one is supplied by the requesting program, to notify the requesting program what the new address of the data block will be. The requesting program can then change any pointers it has to the data block.

Figure 6A:
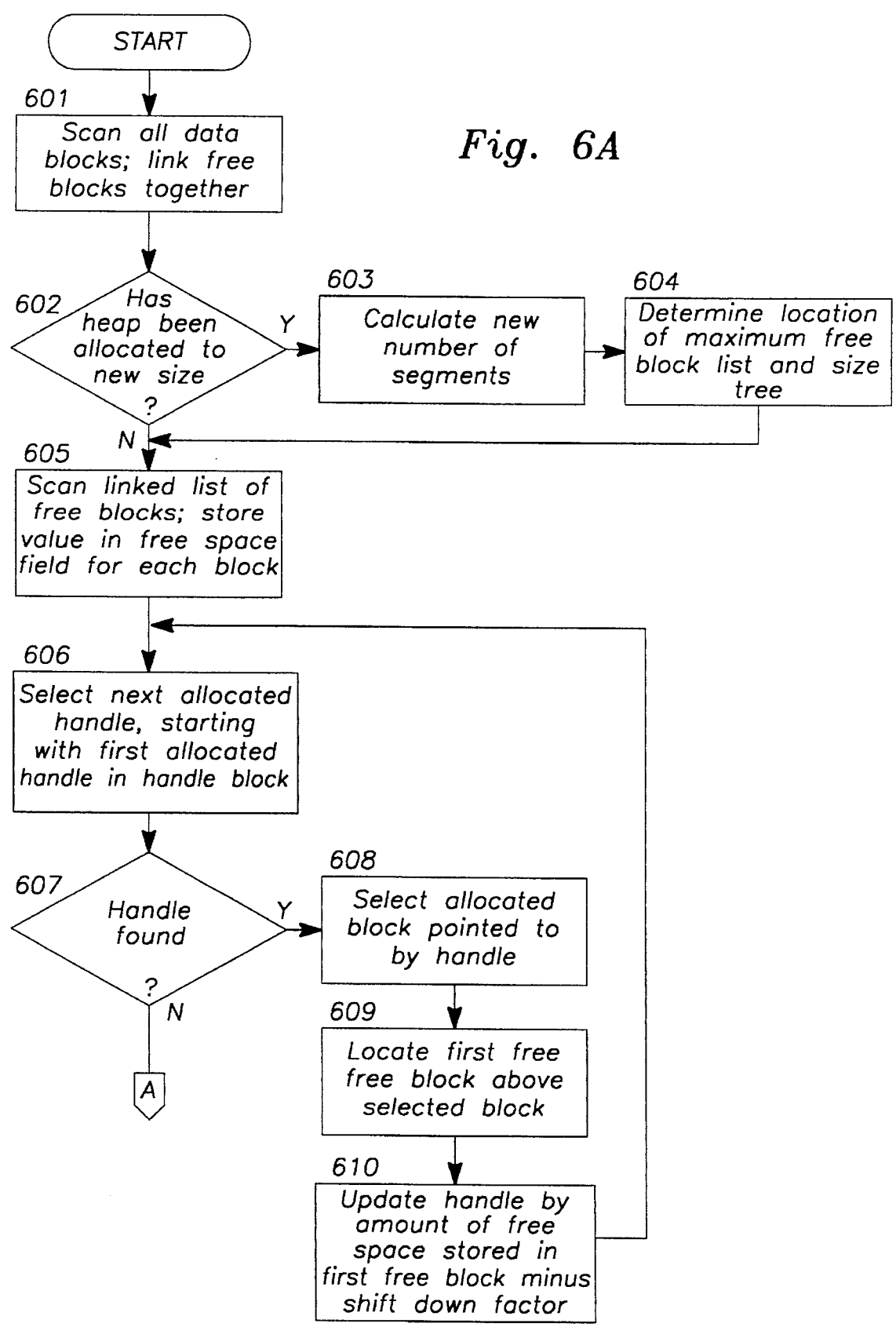
FIGS. 6A–B are detailed flow diagrams of a method used by the present invention to compact the heap.
Figure 6B:
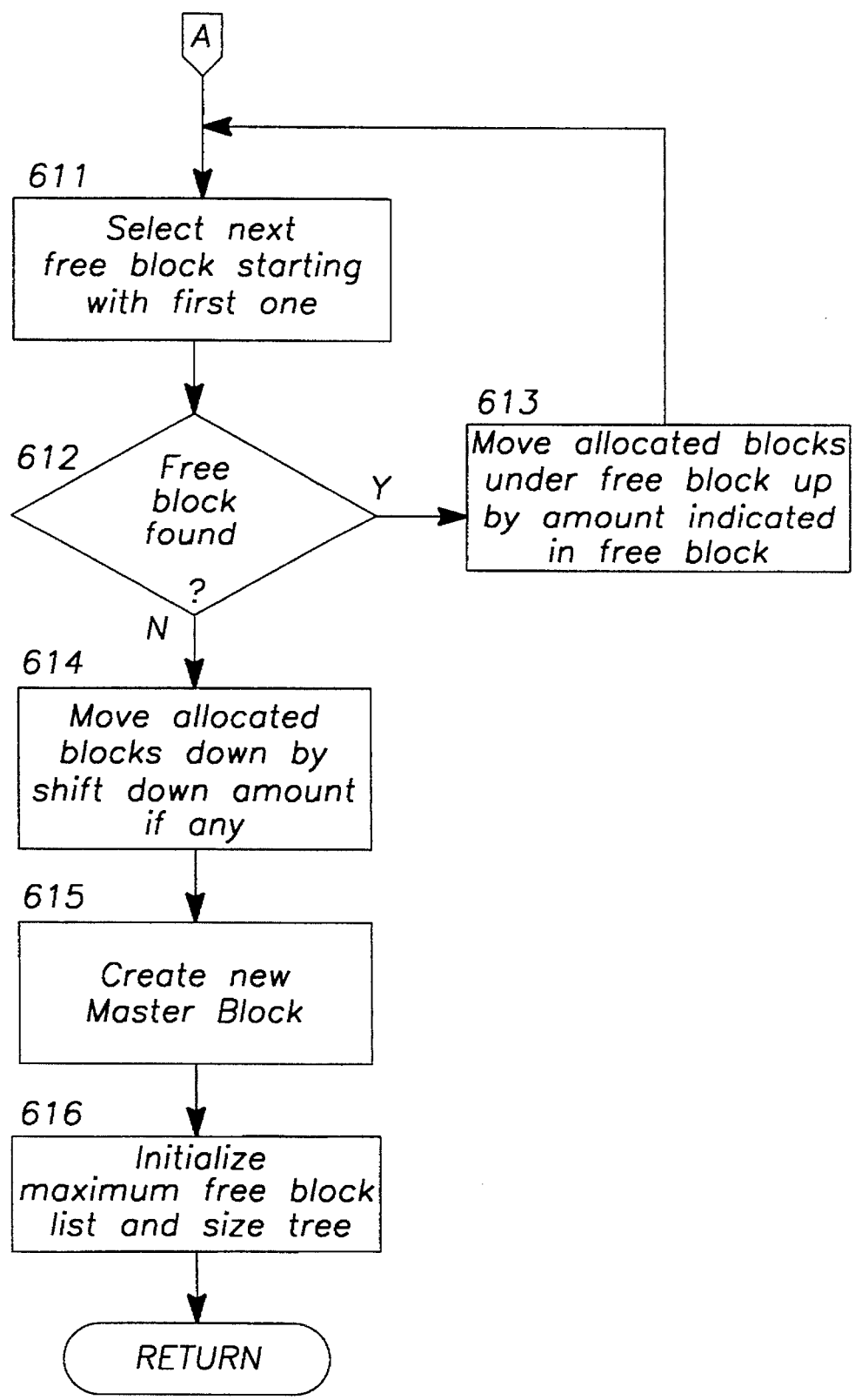

FIGS. 6A–6B are detailed flow diagrams of a preferred embodiment of the present invention. The flow diagram outlines a method used by the Heap Manager to compact the heap by moving all allocated blocks to higher memory addresses, thereby creating one large free block of memory at the bottom of the data block area. The new free block is then incorporated into the master block. Alternatively, a requesting program can allocate a larger or smaller size for the heap.

Referring to step 601 in FIG. 6A, the Heap Manager scans all of the data blocks in the heap and links all the free blocks together. The size field, located at the beginning of each block, contains the size of the block and is used to locate the next block. The Heap Manager links the free blocks from the top of the data block area (higher address) to the bottom of the data block area (lower address). After scanning all of the data blocks and linking the free blocks together, in step 602 the Heap Manager determines whether the requesting program has allocated a new size for the heap. The requesting program has the option of allocating a larger or a smaller size for the heap. When the requesting program requests a smaller size for the heap, the resulting heap size will be the larger of the requested size or the size required to contain the allocated blocks.

When the requesting program allocates the heap to a new size, the control area is moved to the top of the new size heap. If the heap has been allocated to a new size, the process continues on to step 603, where the Heap Manager calculates the number of segments for the new size heap and then in step 604 determines the new location of the maximum free block array and the size tree.

When a heap is allocated to a new smaller size, the compaction is initially executed as though the heap was not changing size. Then, after this first stage the entire group of compacted allocated blocks is moved down to its final position. The difference between the source and destination of this final move is referred to as the shift down amount. When a heap is made larger or kept the same size, the shift down amount is zero. If the heap has not been allocated to a new size, the process skips from step 602 to step 605.

In step 605, the Heap Manager scans the linked list of free blocks and stores a value in each block representing the total amount of free space scanned so far. The total amount of free space is stored in a free space field located within each free block. Preferably, the same space is used for the free hint field and the free space field. This value represents the amount each allocated block below each particular free block will be moved during compaction.

In steps 606–610, the Heap Manager determines the amount each allocated block of memory will be moved during compaction and updates the handles to these blocks accordingly. A handle can be free or allocated; an allocated handle contains an indirect reference to an allocated block. Handles are stored in handle block 210 referenced in FIG. 2B. In step 606, the Heap Manager scans the handle block and selects the next allocated handle, beginning with the first one.

In step 607, the Heap Manager determines whether all of the handles have been selected. If all of the handles have not been selected, the process continues on to step 608. In step 608, the Heap Manager selects the allocated block referenced by the selected handle. In step 609, the Heap Manager attempts to locate the first free block above the selected block. If there is no free block above the selected block, the process loops back to step 606 where the Heap Manager selects the next allocated handle. The Heap Manager locates the free block by first determining which segment contains the selected block. The Heap Manager then searches the maximum free block array for a non-null pointer entry corresponding to a segment above or including the segment that contains the selected block.

Once a non-null pointer entry is found, the Heap Manager searches the free list that is pointed to by the non-null pointer to locate the lowest address free block above the block referenced by the handle. Note that the free list at this time is the list of free blocks created previously in step 601. Once the free block is located, in step 610, the Heap Manager updates the address stored in the selected handle by adding to it the value in the free space field of the free block minus any shift down factor. The Heap Manager repeats step 606 through 610 until all of the handles to the allocated blocks have been selected and updated.

Referring to FIG. 6B, in steps 611–613, the Heap Manager moves the allocated blocks to higher addresses, causing all of the free blocks to accumulate at the bottom of the data block area. In step 611, the Heap Manager selects the next free block, starting with the first one in the linked list generated in step 601. Each free block contains a value in the free space field that indicates the amount of free space above and including the free block. In step 612, the Heap Manager determines whether all of the free blocks have been scanned. If all of the free blocks have not been scanned, in step 613, the Heap Manager moves each allocated block in between the selected free block and the free block below it to new higher addresses. A new address is calculated by adding the old address to the value stored in the free space field of the selected free block.

The Heap Manager repeats steps 611–613 until all of the free blocks have been scanned and the allocated blocks have been moved upward the appropriate amount. After all of the free blocks have been scanned, in step 614, the Heap Manager moves all the allocated blocks down to their final position as indicated by the shift down factor if any. Any resulting free space that has been accumulated at the bottom of the data block area is added to the master block in step 615. In step 616, the size tree and maximum free block array are reinitialized to reflect that there are no longer any free blocks in the heap.

Figure 7A:
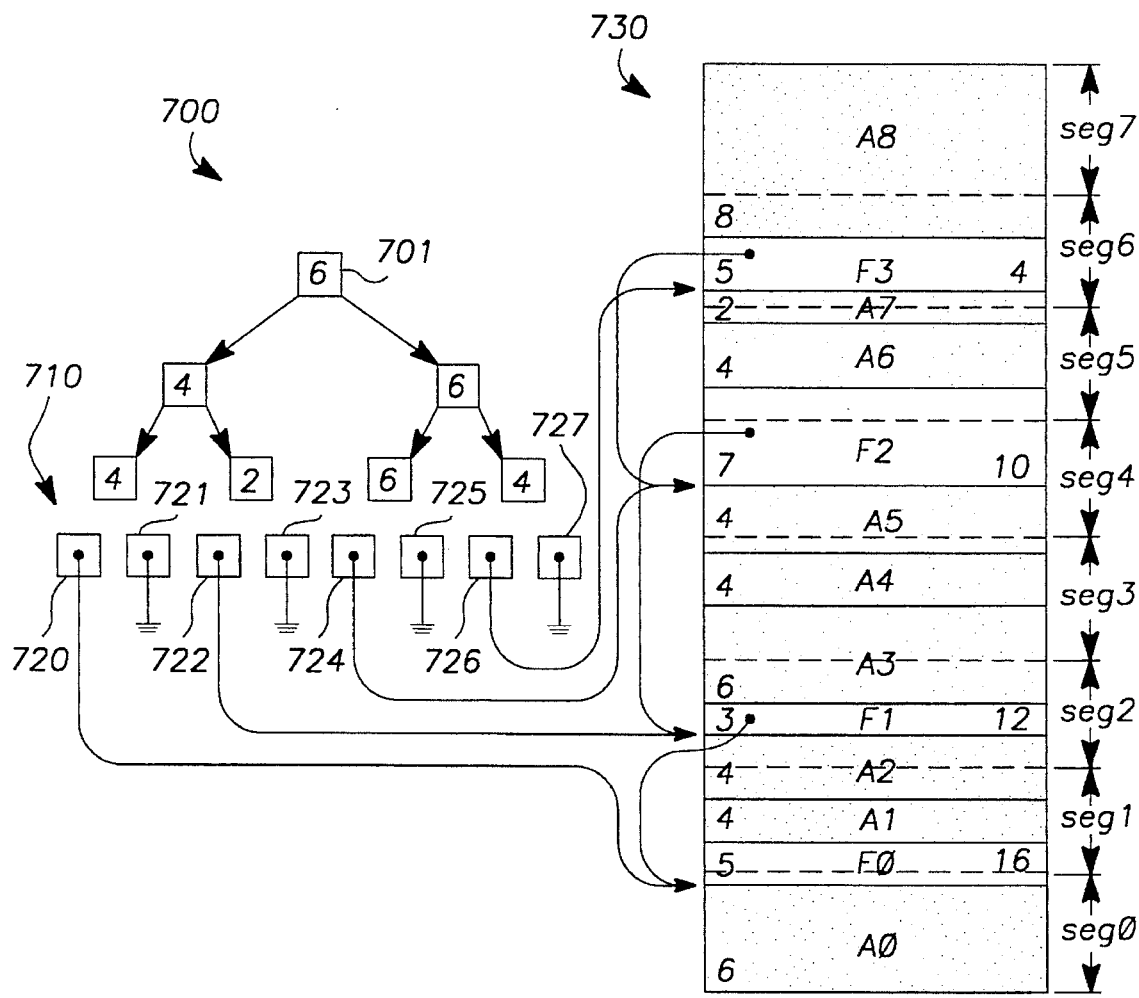
FIG. 7A is a schematic diagram of the size tree, maximum free block array, data block area and handle block before compaction.
Figure 7B:
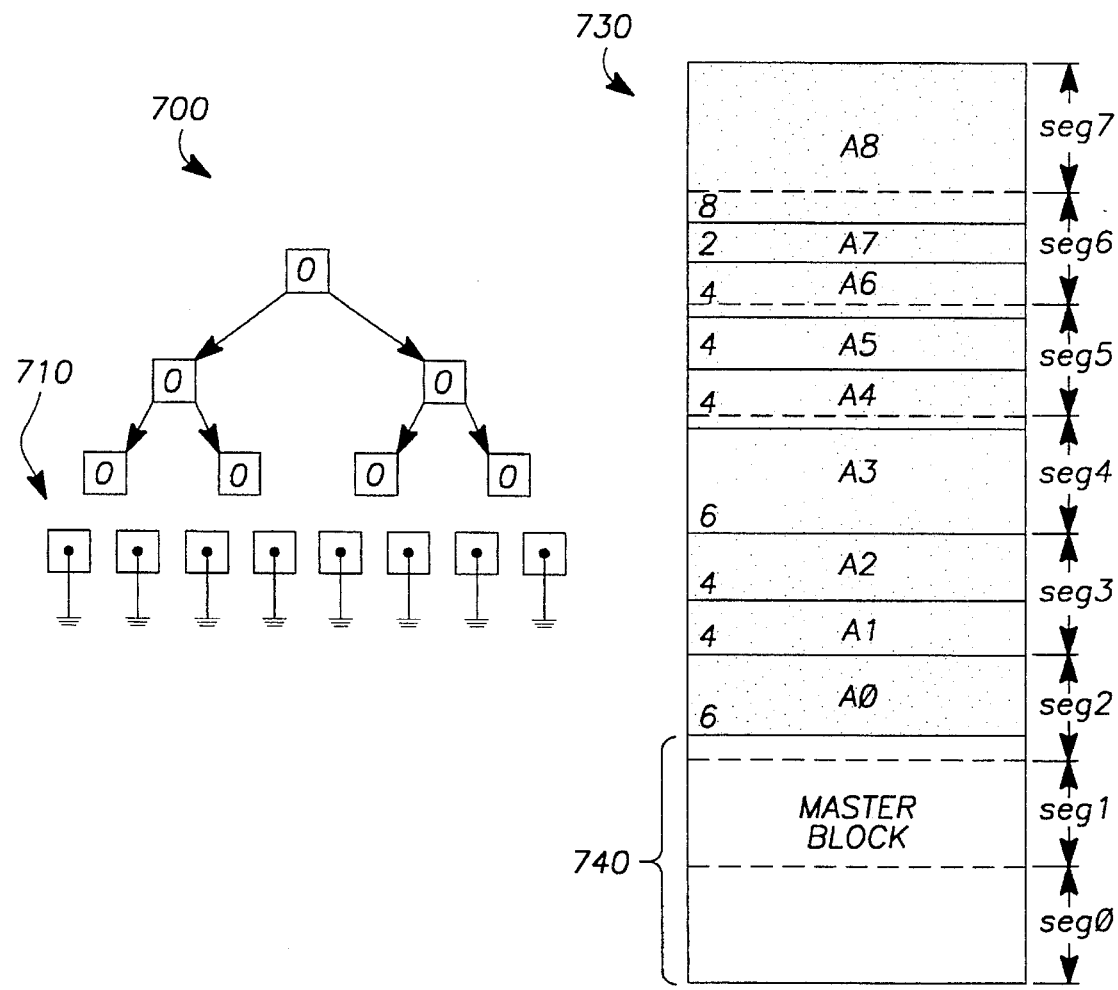
FIG. 7B is a schematic diagram of the size tree, maximum free block array, data block area, master block, and handle block after compaction.

FIGS. 7A and 7B are schematic diagrams used to illustrate an example of the compaction process. FIG. 7A is a schematic diagram of size tree 700, maximum free block array 710, data block area 730, and handle block 750 before compaction, while FIG. 7B is a schematic diagram of size tree 700, maximum free block array 710, data block area 730, master block 740, and handle block 750 after compaction. Even though the handle block is preferably located at the bottom of segment 0, for purposes of this example, handle block 750 is shown without reference to a segment number. The dashed lines in data block area 730 represent segment boundaries, while the solid lines represent block boundaries. Data block area 730 is divided into 8 segments.

In this example, a requesting program has made an allocation request for a block of memory having size 10. Referring to FIG. 7A, the allocation request has failed because the size of largest free block available is 6, as indicated by the root node 701 of the size tree 700. Additionally, the master block was too small for the Heap Manager to transfer free space. Data block area 730 includes free blocks F0–F3 and allocated blocks A0–A8. Handle block 750 includes handles H0–H8, which identify the location of allocated blocks A0–A8, respectively. The size of each block is stored in a size field, which is the first field of each block. For example, the size of block A0 is 6.

The goal of compaction is to consolidate all of the free blocks in data block area 730 to add to the master block. To do this, allocated blocks A0–A7 will have to be physically moved to higher addresses. Allocated block A8 will not be moved because there are no free blocks located above it. To determine the amount each allocated block must be moved, the Heap Manager first scans all of the data blocks and creates a linked list of free blocks by linking together free blocks F0–F3 from the top of the data block area to the bottom. Each free block contains a pointer to the next lower free block. The pointer is preferably located after the size field. The Heap Manager then scans the linked list of free blocks, storing a value in each block representing the cumulative amount of free space scanned so far. This value is stored in the free space field.

For example, the Heap Manager stores 4 in the free space field of free block F3 because free block F3 has size 4, and 4 is the amount of free space scanned so far. The Heap Manager then stores 10 in the free space field of free block F2, which represents the size of free block F3 plus the size of free block F2. The Heap Manager stores 12 and 16 in the free space fields of free blocks F1 and F0, respectively. The value stored in the free space field of the last free block in the linked list of free blocks represents the total amount of free space in the data block area.

After determining the amount of free space above and including each free block and before moving each allocated block, the Heap Manager updates handles H0–H8. As described above, a handle is an identifier of an allocated block of memory. To update a handle to an allocated block, the Heap Manager computes how much the address of the allocated block will change when the allocated block is moved. The value stored in the free space field of a free block is the amount that each allocated block in between the free block and a next lower free block will have to be moved. For example, allocated blocks A3–A5 will be moved up 10, the value stored in the free space field of free block F2 minus the shift down amount, which in this case is 0.

The Heap Manager selects the first handle H5, which is a handle to allocated block A5. Based on the address of block A5, the Heap Manager determines which segment contains block A5. Segment 3 contains block A5, because block A5 starts at address 30. Next, the Heap Manager looks at entry 723 in maximum free block array 710 (entry 723 corresponds to segment 3) to determine if there are any free blocks in segment 3. Entry 723 contains a null pointer, indicating there are no free blocks in segment 3.

The Heap Manager then searches maximum free block array 710 starting with the entry for segment 4, searching for the first non-null pointer entry. Entry 724, corresponding to segment 4 contains a non-null pointer entry. The Heap Manger searches the linked list of free blocks, starting with the free block pointed to by entry 724, searching for the free block whose address is closest to and greater than the address of allocated block A5. Entry 724 points to free block F2. Free block F2 is located above allocated block A5. The Heap Manager updates handle H5 by adding the value stored in the free space field of free block F2 (10) to the address of allocated block A5 (30), and then subtracting any shift down amount. The result is 40, which will be the address of allocated block A5 after it is moved. The new address is stored in handle H5, as shown in FIG. 7B. The above process is repeated to update the remaining handles.

After all of the handles have been updated, the Heap Manager physically moves each allocated block. The Heap Manager selects the first free block F3 in the linked list of free blocks, and determines which allocated blocks are between free block F3 and the next free block in the linked list, free block F2. The Heap Manager then moves all of the allocated blocks in between free blocks F3 and F2 up by the amount stored in the free space field of free block F3. Therefore, allocated blocks A7 and A6 are moved up 4 units. The Heap Manager then selects the next free block F2. Because free block F2 contains the value 10 in its free space field, all of the allocated blocks between free blocks F2 and F1 (allocated blocks A5–A3) are moved up 10 units. This process continues until all of the allocated blocks have been moved up the appropriate amount. Note that allocated block A8 is not moved because there is no free space above it. If the heap is being made smaller, data blocks A0–A8 are moved down by the shift down amount.

FIG. 7B shows the results of the compaction. Data block area 730 contains allocated blocks A0–A8 with no free space in between the allocated blocks. Free blocks F0–F3 of FIG. 7A have been consolidated into master block 740 of FIG. 7B. Handle block 750 contains handles H0–H8. Size tree

700 and maximum free block array 710 have been reinitialized because data block area 730 does not contain any free blocks.

Debugging.

The present invention also provides a method for locating pointers that have not been correctly updated by a requesting program. Requesting programs sometimes use pointers to identify allocated blocks. To ensure that these pointers are properly updated when an allocated block is moved, the present invention provides a debugging mode in which allocated blocks are automatically moved. In effect, the heap is "shaken" to force any pointer errors to surface. When heap shake is enabled, the Heap Manager moves all data blocks a predetermined amount after satisfying an allocation request. When each allocated block is moved, a routine (optionally supplied by the requesting program) is invoked to update any pointers the requesting program has to the moved block.

After all blocks are moved the maximum amount, the blocks are moved back to their starting positions. Movement space for this "heap shake" is preferably maintained in the end block, located above the data block area. The end block is never allocated to a requesting program and the master block is never reduced beyond what is currently necessary to support a heap shake. During each "shake" all of the internal free block pointers are updated by scanning free blocks and adding or subtracting the predetermined shake amount. Then each data block (allocated and free) is moved to its new position. Lastly, all the handles to the allocated blocks are updated to their new values by adding or subtracting a constant. To prevent having to update the size tree, the maximum free block array, and the free lists for each segment, segment addresses are calculated from an adjustable base which is updated after each heap shake.

Although the methods and systems of the present invention have been described in terms of a preferred embodiment, it is not intended that the invention be limited to this embodiment. Modifications within the spirit of the invention will be apparent to those skilled in the art. The scope of the present invention is defined only by the claims that follow.

I claim:

1. A method in a computer system of managing the allocation and freeing of memory within a heap, the heap having a plurality of free blocks and a plurality of allocated blocks and being logically subdivided into a plurality of segments, each block being associated with a segment, the method comprising:

providing a free list for each segment in the heap, each free list comprising a list of the free blocks associated with the segment, the free blocks in the free list being ordered according to size;

providing a free block array having a plurality of entries, each entry corresponding to a segment and containing a pointer to the free list for the corresponding segment;

providing a size tree having a plurality of non-leaf nodes and a plurality of leaf nodes, each non-leaf node having a value such that the value of each non-leaf node is equal to the largest value of its child nodes, and each leaf node corresponding to an entry in the free block array and containing a value indicating the size of the largest free block in the free list pointed to by the entry;

receiving from a requesting program a first request to allocate a block of a requested size;

in response to the received first request, searching the size tree to locate a segment with which is associated a free block that satisfies the received first request, and searching the free list corresponding to the located segment to select the free block that satisfies the received first request;

receiving from the requesting program a second request to free an allocated block; and in response to the received second request, adding the allocated block to the free list for the segment with which the allocated block is associated.

2. The method of claim 1 wherein the size tree is a binary tree and the number of segments is a power of two.

3. The method of claim 1 wherein the step of providing a free list for each segment includes providing a linked free list for each segment, each linked free list comprising a linked list of the free blocks in the segment.

4. The method of claim 1 wherein the segments of the heap are ordered from a low segment to a high segment and the step of searching the size tree includes searching the size tree to locate the highest segment with which is associated a free block having a size large enough to satisfy the first request.

5. The method of claim 1 wherein the segments of the heap are ordered from a high segment to a low segment and the step of searching the size tree includes searching the size tree to locate the lowest segment with which is associated a free block having a size large enough to satisfy the first request.

6. The method of claim 1 wherein the step of searching the size tree includes the steps of:

traversing the size tree to select a leaf node that contains a value large enough to satisfy the first request;

selecting a free block array entry corresponding to the selected leaf node, the selected free block array entry pointing to a free list that contains a free block large enough to satisfy the first request;

selecting a free block from the free list pointed to by the selected free block array entry, the free block being large enough to satisfy the first request;

removing the selected free block from the free list; and updating the size tree and the free block array to reflect the removal of the selected free block from the free list.

7. A memory management system for managing a computer memory comprising:

a block area comprising a plurality of free blocks and a plurality of allocated blocks, the block area being subdivided into a plurality of segments;

a free list for each segment, wherein the free list is a list of the free blocks in the segment, the blocks that make up the free list being positioned within the free list according to block size;

a free block array having an entry corresponding to each segment in the block area, each entry containing a pointer to the free list for the corresponding segment;

a size tree comprising at least one non-leaf node and a plurality of leaf nodes, each non-leaf node having a plurality of child nodes, each node having a value, each leaf node corresponding to a plurality of entries in the free block array and having a value indicating the size of the largest free block in the segments corresponding to the plurality of entries, wherein the value of each non-leaf node is equal to the largest value of its child nodes; and a memory manager for receiving a request to allocate a block with a request size, traversing the size tree to select an entry in the free block array, following the pointer stored in the selected entry to a free list for a particular segment, and searching the free list for the particular segment to locate a free block beginning in the particular segment and having a size large enough to satisfy the request.

8. The memory management system of claim 7 wherein the block area is subdivided into $2^n$ segments.

9. The memory management system of claim 7 wherein the size tree is a binary tree.

10. The memory management system of claim 7 wherein the free list is a linked list.

11. The memory management system of claim 7 wherein each allocated block has a corresponding handle, and including a handle mapping table to map each handle to the corresponding allocated block.

12. The memory management system of claim 11 wherein the handle mapping table is stored in an allocated block.

13. A computer memory management system comprising:
   a heap of memory logically subdivided into segments, each segment including a plurality of free blocks and allocated blocks, each free block and allocated block having a block size;
   a free list for each segment, each free list comprising a linked list of free blocks in that segment, the free blocks being ordered in the linked list by block size;
   a free block array having one entry for each segment in the heap, each entry comprising a pointer to a first free block within the free list for that segment;
   a size tree for organizing block sizes of first free blocks, the size tree having non-leaf nodes and leaf nodes, each non-leaf node having a plurality of child nodes, each non-leaf node having a value such that the value of each non-leaf node is equal to the largest value of its child nodes, and each leaf node corresponding to an entry in the free block array and having a value indicating the size of the largest first free block in the segment corresponding to the entry;
   means for traversing the size tree to select an entry in the free block array, the entry corresponding to a particular segment; and
   means for following the pointer stored in the selected entry to a first free block within the free list for said particular segment.

14. The computer system of claim 13 wherein the heap is subdivided into $2^n$ segments of substantially uniform size.

15. In a computer system having memory and executing at least one program, a method of dynamically managing the allocation and freeing of memory within a heap of memory of the system, the heap having a plurality of free blocks and a plurality of allocated blocks, the heap being logically subdivided into a plurality of segments, each block being associated with a segment, the number of segments being a power of two and each segment having a free list, the free list linking the free blocks associated with the segment according to a size ordering and being accessible through a size tree and a free block list, the free block list having a plurality of entries, each entry corresponding to a segment and pointing to the free list for the segment, the size tree having a root node, a plurality of child nodes, and a plurality of leaf nodes, each node having a value such that the nodes of the size tree are arranged as a complete binary tree wherein the value of each node is not exceeded by the value of its child nodes, and each leaf node corresponding to two entries in the free block list and having a value indicating the size of the largest free block associated with the segments corresponding to the entries, the method comprising the steps of:

in response to a request issued by a program executing in the computer system, selecting a free block of memory of a requested size from the heap for allocation to the requesting program, wherein the free block is selected by searching the size tree and free block list to locate a segment with which is associated a free block that satisfies the request and then searching the free list corresponding to the selected segment to locate the smallest free block of the free list that satisfies the request;

in response to a request issued by a program executing in the computer system, freeing an allocated block of memory and consolidating the newly freed block with any free blocks that are located immediately adjacent in memory to the newly freed block; and in response to a request issued by a program executing in the computer system, when the heap does not contain a free block of the requested size, creating a free block having a size that is greater than or equal to the requested size.

16. The method of claim 15 wherein the step of creating a free block includes the step of compacting allocated blocks into higher memory addresses, thereby accumulating free blocks into lower memory addresses, the accumulated free blocks being consolidated to create one free block.

17. The method of claim 15 wherein the step of creating a free block includes the step of enlarging the heap.

18. The method of claim 17 wherein the step of selecting a free block of memory for allocation includes the additional steps of:
   providing a request for a block having a certain size;
   searching the size tree and selecting a leaf node that contains a value that is large enough to satisfy the request;
   selecting a free block list entry corresponding to the selected leaf node which points to a free list that contains a free block large enough to satisfy the request;
   selecting a free block from the free list pointed to by the selected free block list entry that best fits the request;
   removing the selected free block from its free list; and
   updating the size tree and free block list to reflect the removal of the selected free block from its free list.

19. The method of claim 15 wherein each entry of the free block list contains a pointer to a free block that has the largest size in a segment.

20. The method of claim 15 wherein the plurality of free blocks that comprises the heap includes a master block and wherein the step of selecting a block of memory of a requested size includes the additional steps of:
   (a) when the requested size is less than or equal to the value contained in the root node of the size tree
      (i) selecting the rightmost leaf node of the size tree that contains a value that is greater than or equal to the requested size,
      (ii) selecting a free block list entry that corresponds to the selected leaf node such that the free list pointed to by the entry contains a free block that is greater than or equal to the requested size,
      (iii) selecting the free list pointed to by the selected free block list entry,
      (iv) selecting the smallest free block in the selected free list whose size is greater than or equal to the requested size,
      (v) removing the selected free block from the selected free list, (vi) allocating a portion of the selected free block to the requesting computer program, wherein the portion is equal to the requested size, (vii) adding the unallocated portion of the selected free block to the selected free list, and (viii) updating the size tree and free block list when the selected free list is modified; and (b) when the requested size is greater than the value contained in the root node of the size tree (i) consolidating the master block with any free blocks immediately above it, and (ii) allocating a portion of the master block to the requesting computer program, wherein the portion is equal to the requested size.

21. The method of claim 15 wherein each block in the heap contains a count field at beginning of the block and a free hint field at the end of the block, the size of the block being stored in the count field and an allocation indicator being stored in the free hint field, and wherein the step of freeing a block of memory includes the additional steps of:

(a) providing the address of a current block, wherein the current block is the block to be freed;

(b) examining the free hint field of a lower block, wherein the lower block is located immediately below the current block;

(c) when the free hint field of the lower block contains an allocation indicator that indicates the block is free (i) examining the free list corresponding to a current segment, wherein the current segment is the segment with which the current block is associated, (ii) determining whether the lower block is in the free list corresponding to the current segment, (iii) when the lower block is not in the free list corresponding to the current segment, (1) searching the free block list backwards from the entry for the current segment until a non-zero entry or the beginning of the free block list is found, (2) if a non-zero entry is found in the free block list, selecting the free list pointed to by the non-zero entry, (3) determining whether the lower block is in the selected free list, (iv) when the lower block is in a free list, consolidating the current block with the lower block and updating the free list that contains the lower block;

(d) examining the count field of an upper block, wherein the upper block is immediately above the current block;

(e) when the upper block is free, removing the upper block from the free list associated with the upper block;

(f) consolidating the current block with the upper block; and (g) adding the current block to the free list corresponding to the consolidated blocks and the size tree.

22. The method of claim 19 wherein each block in the heap contains a count field and a free hint field, the size of the block being stored in the count field and an allocation indicator being stored in the free hint field, wherein a first segment is located at a lower memory address and a last segment is located at a higher memory address, and wherein the step of freeing a block of memory includes the additional steps of:

(a) providing the address of a current block, wherein the current block is the block to be freed;

(b) examining the free hint field of a lower block, wherein the lower block is located immediately below the current block;

(c) when the free hint field of the lower block contains an allocation indicator that indicates the lower block might be free, (i) searching the free lists corresponding to the current segment and the segments below the current segment for the lower block, (ii) if the lower block is found in one of the searched free lists, consolidating the current block with the lower block and updating the free list that contains the lower block, (d) examining the count field of the block immediately above the current block, wherein the block immediately above the current block is known as the upper block, to determine whether the upper block is free, wherein the lowest bit of the count field contains an indicator indicating if the block is free or allocated;

(e) when the upper block is free, consolidating the current block with the upper block and removing the upper block from its free list; and (f) updating the free list for the current segment.

23. In a computer system, a method of allocating free memory from a heap of memory, the method comprising the steps of:

dividing the heap into a plurality of segments, each segment having a fixed size;

further dividing the heap into a plurality of blocks, each block having a starting address, each block being associated with the segment within which said block has its starting address, each block having an associated state variable, the state variable indicating whether the block is free or allocated, a block whose associated state variable has a value of free being called a free block;

providing for each segment a free list, the free list comprising a size-ordered linked list of free blocks having starting addresses within the segment;

providing a size tree for classifying segments according to the size of a largest free block having a starting address within each segment;

providing a collection of pointers accessible via a traversal of the size tree, each pointer pointing to the free list provided for a segment, the pointers of the collection corresponding one-for-one with the segments of the plurality;

receiving a memorial allocation request from a requesting program executing in the computer system, the request including a requested size; and responsively to the received request, traversing the size tree to find a segment containing a block of size greater than or equal to the requested size, following a pointer of the collection for the found segment to reach the free list for that segment, searching the free list thus reached according to the size ordering of the free list thus reached to select a free block of size greater than or equal to the requested size, allocating to the requesting program a block comprising a portion of the selected block, the portion being of size greater than or equal to the requested size, and changing the state variable value of the allocated block from free to allocated.

24. The method of claim 23 wherein the dividing step comprises dividing the heap into segments of substantially uniform size.

25. The method of claim 23 wherein the dividing step comprises dividing the heap into $2^n$ segments.

26. The method of claim 23 wherein the allocating step comprises dividing the selected block into a first portion and a second portion, constructing from the first portion the block to be allocated to the requesting program, and constructing from the second portion a new free block.

27. The method of claim 23 and further comprising the step of consolidating a first free block with a second free block, the first and second blocks being adjacent to one another in memory of the heap.

28. The method of claim 23 wherein the step of providing a free list comprises providing a linked free list, and the searching step comprises traversing the links of the free list reached in the following step.

* * * * *